US006195904B1

(12) United States Patent
Greer

(10) Patent No.: US 6,195,904 B1
(45) Date of Patent: Mar. 6, 2001

(54) ADJUSTABLE TILE MEASURING DEVICE

(76) Inventor: Bret M. Greer, 1700 Dover Rd. Apt. 207, Delray Beach, FL (US) 33445

( * ) Notice: Subject to any disclaimer, the term of this patent is extended or adjusted under 35 U.S.C. 154(b) by 0 days.

(21) Appl. No.: 09/056,311

(22) Filed: Apr. 7, 1998

(51) Int. Cl.[7] ...................................................... G01B 1/00

(52) U.S. Cl. ................................ 33/527; 33/526; 33/494; 33/679.1; 33/DIG. 20

(58) Field of Search ............................ 33/527, 526, 194, 33/197, 567.1, 427, 464, 467, 494, 679.1, 806, 809, 810, 452, 484, 485, DIG. 20

(56) References Cited

U.S. PATENT DOCUMENTS

| | | | | |
|---|---|---|---|---|
| 1,488,482 | * | 4/1924 | Eckman | 33/418 |
| 2,144,697 | | 1/1939 | Zangrando | 33/527 |
| 2,642,674 | | 6/1953 | Schell, Jr. | 33/527 |
| 3,159,394 | * | 12/1964 | Burns | 269/74 |
| 3,183,598 | | 5/1965 | Parr | 33/527 |
| 3,548,505 | | 12/1970 | DiCandido | 33/527 |
| 3,611,579 | | 10/1971 | Reid | 33/527 |
| 3,718,980 | | 3/1973 | Poulos | 33/526 |
| 4,504,003 | * | 3/1985 | Moody | 225/96.5 |
| 4,734,993 | * | 4/1988 | Pan | 33/483 |
| 4,827,625 | | 5/1989 | Le Moal | 33/527 |
| 4,899,455 | | 2/1990 | Bovino et al. | 33/527 |
| 5,191,716 | * | 3/1993 | Anderson | 33/483 |
| 5,361,508 | | 11/1994 | Ruggiero | 33/527 |
| 5,471,758 | | 12/1995 | White, Sr. | 33/527 |

* cited by examiner

*Primary Examiner*—Andrew H. Hirshfeld
*Assistant Examiner*—R. Alexander Smith
(74) *Attorney, Agent, or Firm*—Malin, Haley & DiMaggio, P.A.

(57) ABSTRACT

A tile measuring device including a pair of transparent, slidably connected plates having reference indicia thereon. A rotatable handle, defining a threaded aperture, is mounted on a threaded member, fixed to the bottom plate, and is rotatably adjustable from a first position wherein the top and bottom plates are fixedly secured relative to one another, to a second position wherein the top and bottom plates may be slidably adjusted. The top and bottom plates each include linear dimension markings along at least one side of the device such that when the top and bottom plates are telescopically adjusted and fixed relative to one another the markings provide linear dimension references. In addition, each of the top and bottom plates include longitudinal markings for use in cutting notches in tiles. An adjustable template according to the present invention is particularly useful in measuring and cutting tile for installation around the periphery of a tiled area adjacent to a boundary, such as a wall, an obstruction, or the like, while accounting for the size of grout joints on either side of the tile.

12 Claims, 7 Drawing Sheets

ADJUSTABLE TILE MEASURING DEVICE

BACKGROUND OF THE INVENTION

1. Field of the Invention

The present invention relates to floor tile measuring devices, and particularly to an adjustable floor tile measuring device for measuring and marking tile prior to cutting to insure that the tile is properly cut for installation adjacent to an obstruction.

2. Description of Related Art

The use of ceramic and clay floor tiles is well known. Typically, tiles are bonded to an underlying subfloor using bonding material such as thin set mortar. Tiles are commonly laid in place with a small, uniform gap existing between adjacent tiles, which gaps are filed with grout. The term thin set mortar is used to describe the method of installing tiles with bonding material that is usually 3/32 of an inch to 1/8 of an inch in thickness. In other installations, a mortar bed up to two inches in thickness facilitates accurate slopes or planes in finished tile work on floors and walls. Portland Cement Mortar, comprising a mixture of Portland cement and sand, is suitable bonding material for most surfaces in ordinary types of installations.

Portland Cement is the base for most grout and is modified to provide specific qualities such as whiteness, mildew resistance, uniformity, hardness, flexibility and water retentiveness. Non-cement based grouts such as epoxies, furans and silicone rubber offer properties not possible with cement grouts.

Floor tile is typically rectangular or square, however, other shapes are commonly available. One task that must be routinely executed when laying rectangular floor tile involves cutting tiles which are to be laid about the perimeter of a given space such that the cut tile is suitably sized for installation between the last laid full size tile and a marginal straight edge, such as a wall, bounding the zone in which the tile is laid. To accomplish this, the common practice has been to cut perimeter tiles to fit the remaining space between the last laid tile the wall using a tape measure while accounting for grout joint spacing on each side of the perimeter tile. This method, however, is time consuming and requires precise alignment of the loose tile to permit it to be scribed and cut accurately. If the tile is not properly positioned, aligned, or cut, then the tile will not properly fit the available space. The problem is even more pronounced when the tile setter does not possess the skill of a professional.

U.S. Pat. No. 2,144,697, issued to Zangrando, discloses a tile cutting gauge including a base plate and a slide plate.

U.S. Pat. No. 2,642,674, issued to Schell, Jr., discloses an implement for use in laying square tile which comprises a rectangular plate.

U.S. Pat. No. 3,548,505, issued to DiCandilo, discloses a tile fitting tool having an upturned lip along one edge and a downturned lip along an opposite edge.

U.S. Pat. No. 3,611,579, issued to Reid, discloses a floor tile marking gauge comprising an adjustable template and guide frame for marking and cutting tile.

Furthermore, U.S. Pat. Nos. 3,183,598, 3,718,980, 4,827,625, 4,899,455, 5,361,508, and 5,471,758, each disclose tile setting tools of various sorts.

The background art, however, fails to disclose an adjustable tile measuring device with transparent plates each having a first set of markings for measuring tile for installation next to a wall, and a second set of markings for measuring for notching such that the tile can be installed around door jambs and the like.

BRIEF SUMMARY OF THE INVENTION

An adjustable template for measuring and marking tile for defining a portion of the tile to be removed such that a suitably sized tile is obtained for installation next to an obstruction, such as a wall. The invention is particularly useful to a tile setter laying tiles next to obstructions such as walls, door jambs and the like.

A tile measuring template according to the present invention includes a pair of transparent, slidably connected top and bottom plates having reference indicia thereon. In the preferred embodiment, the bottom plate includes a vertically extending threaded member and opposing edges each forming a vertically extending lip. The top plate defines a slotted aperture and is sized for overlapping engagement with the bottom plate. The top and bottom plates are slidably engaged such that the bottom plate threaded member is received within the top plate slotted aperture, and the top plate is slidably confined by the vertically extending lips along the bottom plate edges. A rotatable handle, defining a threaded aperture, is mounted on the threaded member and rotatably adjustable from a first position wherein the top and bottom plates are fixedly secured relative to one another, to a second position wherein the top and bottom plates may be slidably adjusted.

Each of the top and bottom plates have reference indicia thereon for use by the tile installer in marking and cutting tile. In the preferred embodiment, the indicia includes linear dimension markings on each of the top and bottom plates along at least one side of the device such that when the top and bottom plates are telescopically adjusted and fixed relative to one another the markings provide linear dimension references. In addition, each of the top and bottom plates include longitudinal markings, running perpendicular to the linear dimension markings, in the direction of telescopic adjustability. The longitudinal markings are preferably supplemented by alphanumeric indicia for distinguishing the markings and ease of reference. Since each of the top and bottom plates are transparent, the user is able to visually detect an underling tile and is thus able to insure that the tile is correctly positioned and aligned prior to scoring.

An adjustable template according to the present invention is particularly useful in measuring and cutting tile for installation around the periphery of a tiled area adjacent to a boundary, such as a wall, an obstruction, or the like, while accounting for the size of grout joints on either side.

Accordingly, it is an object of the present invention to provide an adjustable tile measuring device for use by a tile installer in marking tiles for cutting to fit.

In accordance with these and other objects which will become apparent hereinafter, the instant invention will now be described with particular reference to the accompanying drawings.

DETAILED DESCRIPTION OF THE INVENTION

Figure 1:
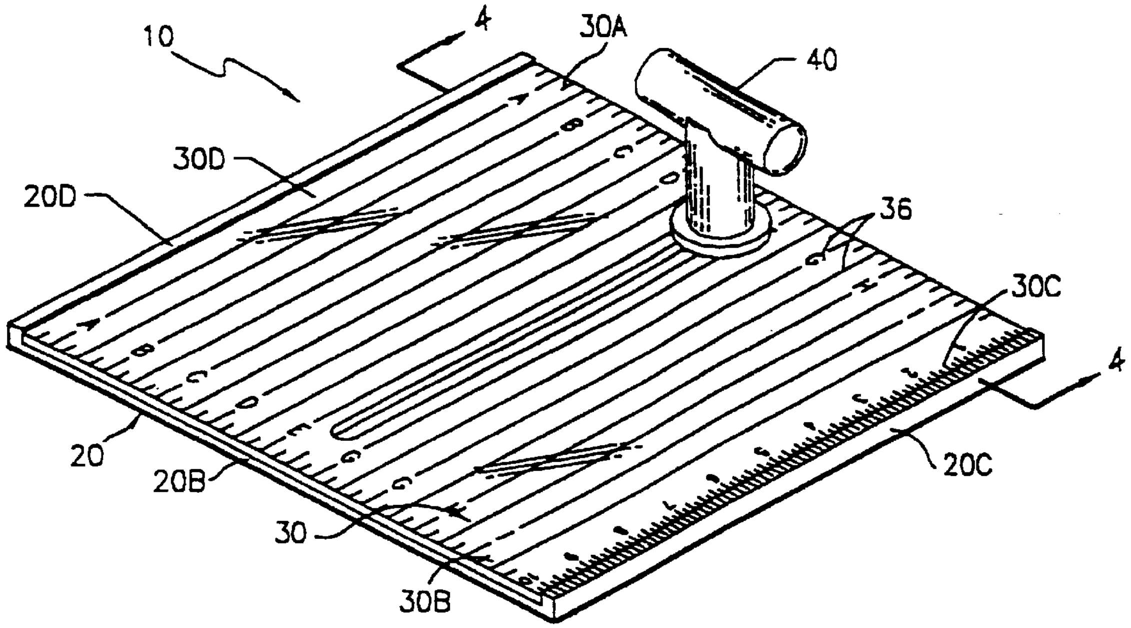
FIG. 1 is a top perspective view of a tile measuring device according to the present invention.
Figure 2:
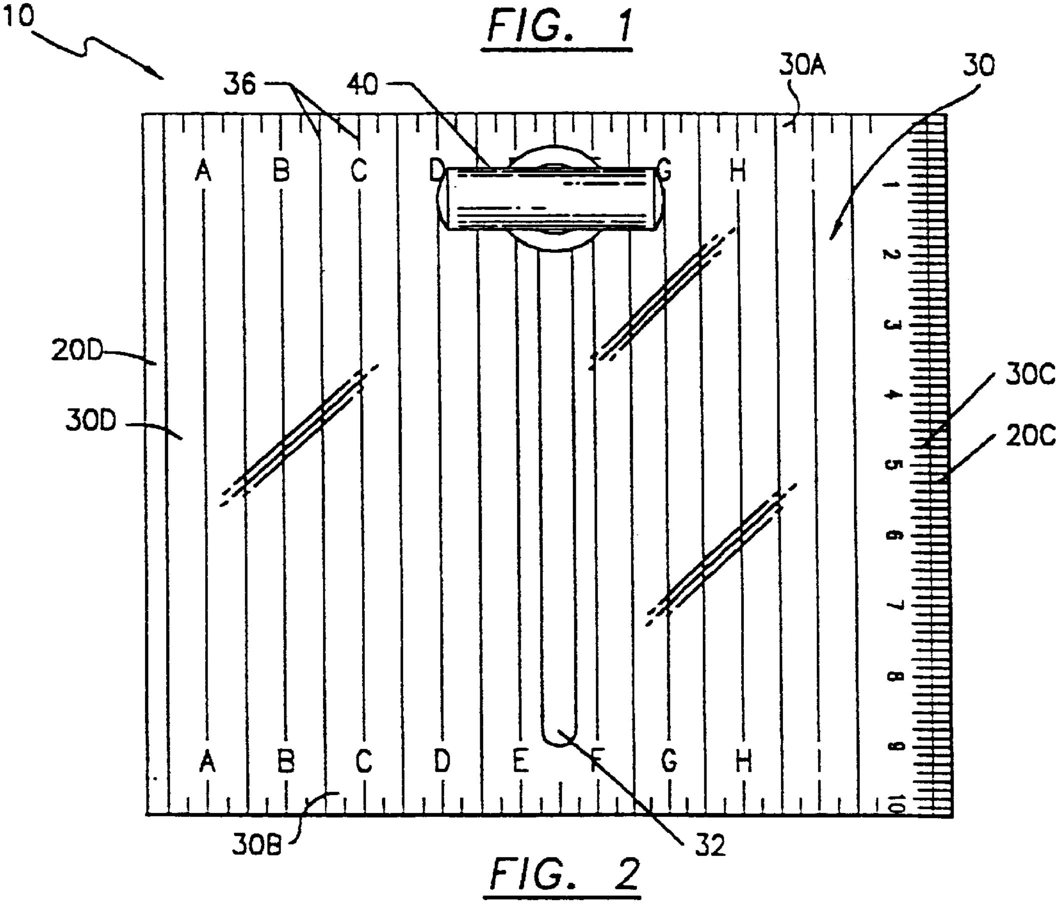
FIG. 2 is a top plan view of the tile measuring device shown in FIG. 1.

FIGS. 1–5 depict an adjustable tile measuring device according to the present invention, generally referenced as 10, for use in measuring and marking tile. Tile measuring device 10 includes a bottom plate 20 and top plate 30, each having reference indicia thereon. Bottom plate 20 and top plate 30, are each fabricated of transparent material and are preferably square in shape and has a relatively thin cross section. The use of transparent material provides a significant advantage in that it allows the user visually inspect the alignment of tiles while using the device as will soon become apparent. Plates 20 and 30 may be sized to any suitable dimension, however, it is considered desirable the size of the plates correspond to the size of tiles commonly available. By way of example, bottom plate 20 and top plate 30 may have length and width dimensions of 6"×6", 10"×10", or 17"×17", however, any suitable dimensions are considered within the scope of the present invention.

Bottom plate 20 includes a front edge 20A, a rear edge 20B, and opposing sides 20C and 20D each defining a vertically extending lip. Plate 20 further includes a threaded member 22, vertically extending from the upper surface thereof. Bottom plate 20 further includes reference indicia on the upper surface thereof for use by the tile installer in marking and cutting tile. In the preferred embodiment, the indicia includes first and second sets of linear dimension markings. A first set of markings, referenced as 24 are disposed along a side, 20C and/or 20D, of plate 20. First markings 24 are preferably small ticks, corresponding to inches of length and fractions thereof. A second set of markings, referenced as 26, run from longitudinally from front edge 20A to rear edge 20B. Longitudinal markings 26 preferably comprise solid lines which are spaced at ½-inch increments. In the preferred embodiment, markings 26 include alpha-numeric indicia associated with every other line thereby providing indicia at 1-inch increments.

Top plate 30 includes a front edge 30A, a rear edge 30B, and opposing sides 30C and 30D. Top plate 30 defines a slotted aperture 32 for receiving threaded member 22 of bottom plate 20. Top plate 30 also includes reference indicia on the upper surface thereof for use by the tile installer in marking and cutting tile. In the preferred embodiment, the indicia includes first and second sets of linear dimension markings, similar to the markings existing on bottom plate 20. A first set of markings, referenced as 34 are disposed along a side, 30C and/or 30D, of top plate 30. First markings 34 are preferably small ticks, corresponding to inches of length and fractions thereof. A second set of markings, referenced as 36, run longitudinally from front edge 30A to rear edge 30B. Markings 36 preferably comprise solid lines which are spaced at ½-inch increments. In the preferred embodiment, markings 36 also include alpha-numeric indicia associated with every other line thereby providing indicia at 1-inch increments.

Figure 3:
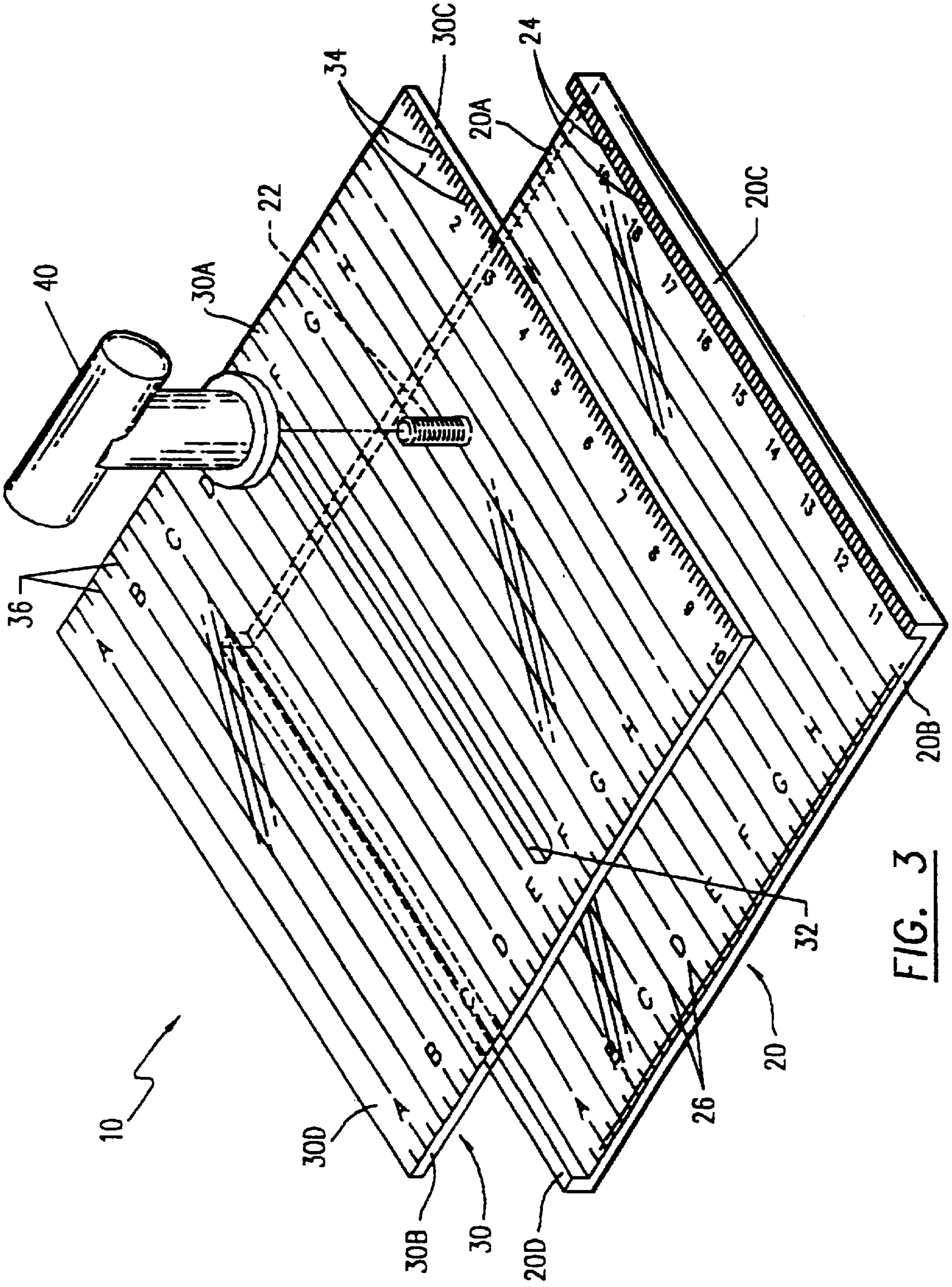
FIG. 3 is an exploded top perspective view of the tile measuring device.
Figure 4:
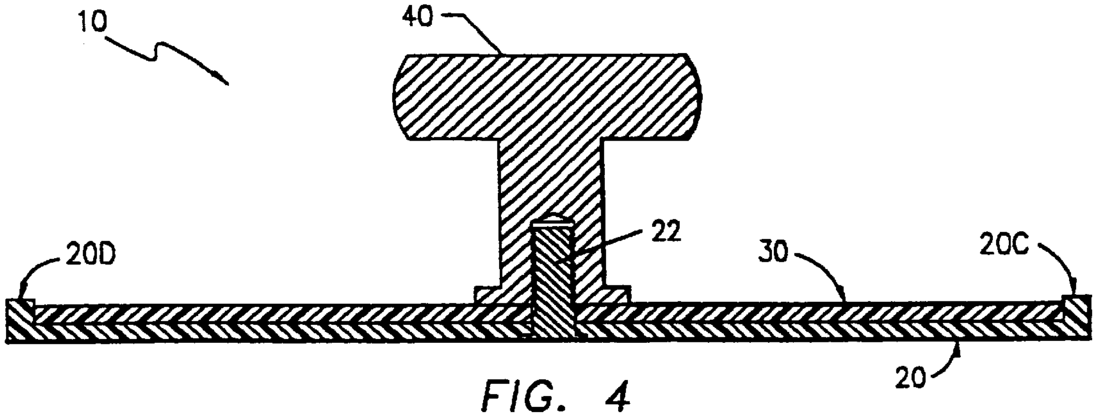
FIG. 4 is a sectional view of the tile measuring device taken along line 4—4 of FIG. 1.
Figure 5:
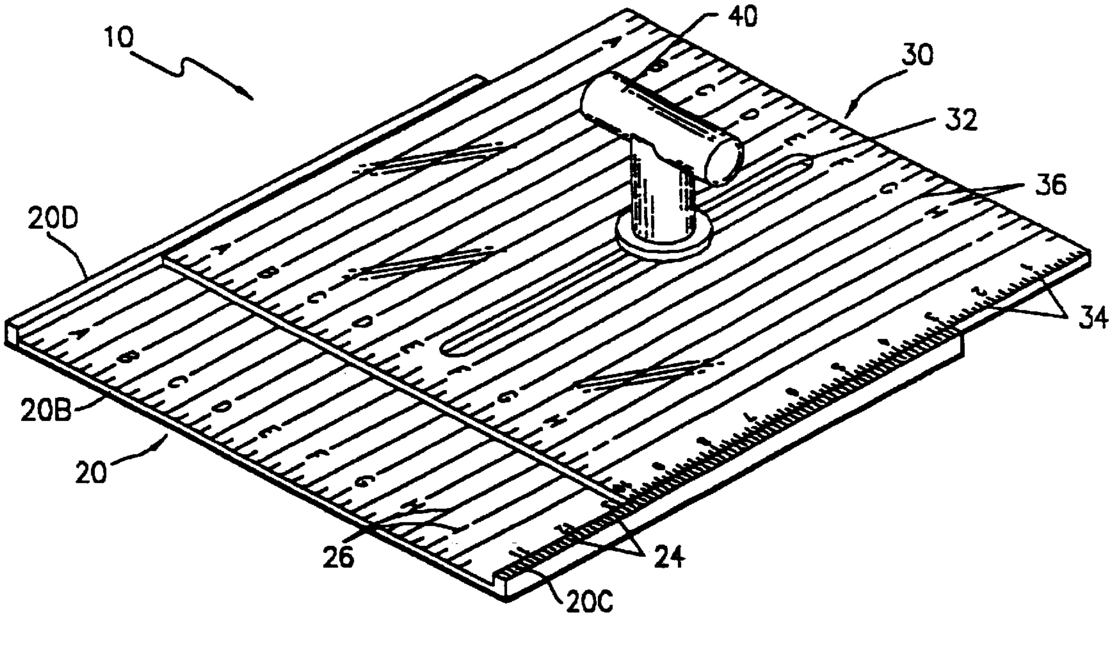
FIG. 5 is a top perspective view of the tile measuring device with the top and bottom plates in an offset configuration.

Bottom plate 20 and top plate 30 are matingly and slidably connected as best depicted in FIGS. 3–5. Specifically, top plate 30 is slidably disposed on bottom plate 20 such that threaded member 22 is received within slotted aperture 32, and top plate edges 30C and 30D are confined within bottom plate side edge lips 20C and 20D. A rotatable handle 40, defining a threaded aperture, is mounted on the threaded member such that top plate 30 is disposed between handle 40 and bottom plate 20. Handle 40 is rotatably adjustable from a first position wherein the top and bottom plates are fixedly secured relative to one another, to a second position wherein the top and bottom plates may be slidably/telescopically adjusted. Accordingly, top and bottom plate linear dimension markings cooperate to provide a continuous linear dimensional scale when top and bottom plates 20 and 30 are telescopically extended. Furthermore, longitudinal markings, running perpendicular to the linear dimension markings, in the direction of telescopic adjustability.

Figure 6:
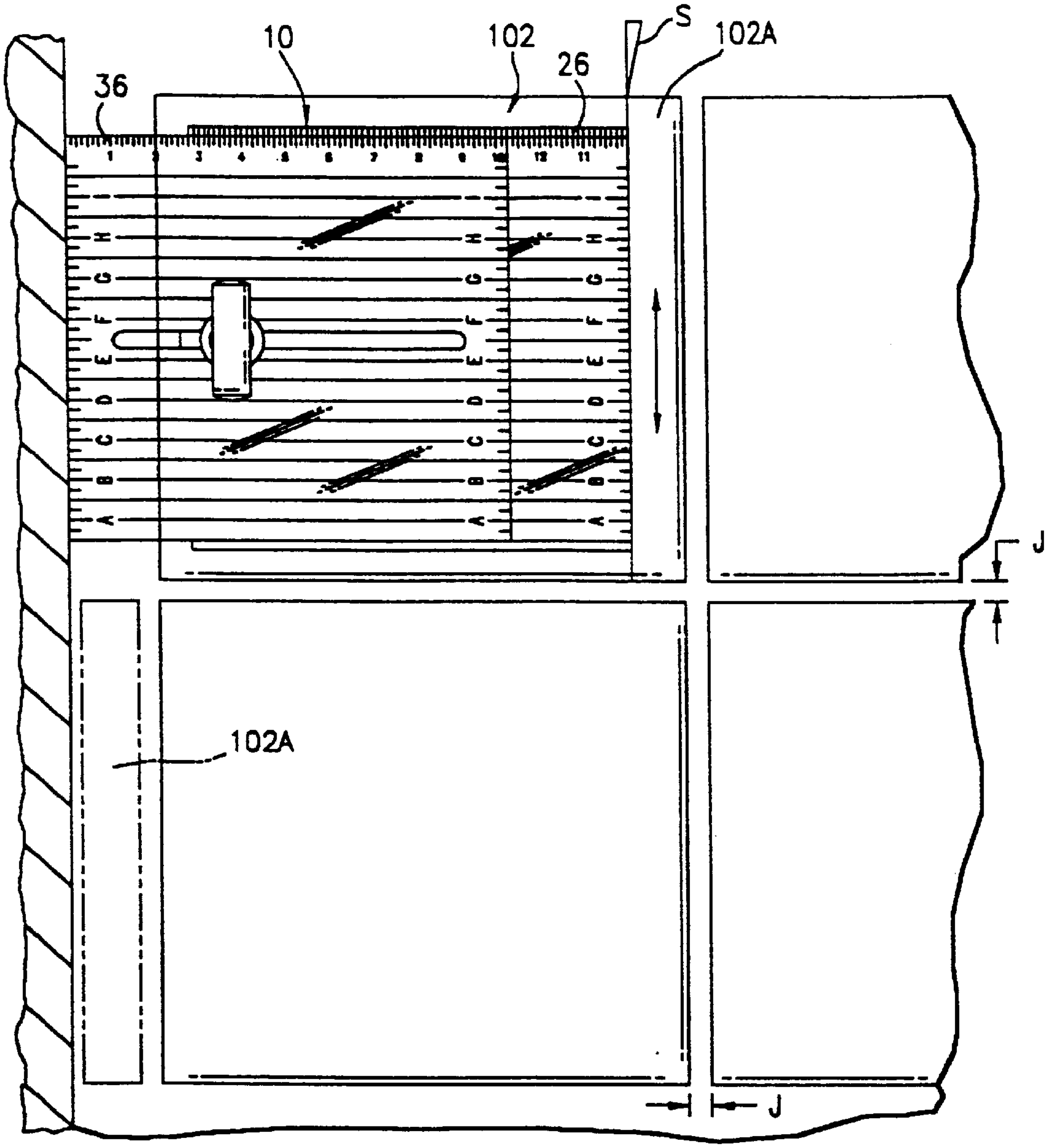
FIG. 6 is a top plan view of the tile measuring device in use during the installation of floor tile.
Figure 7:
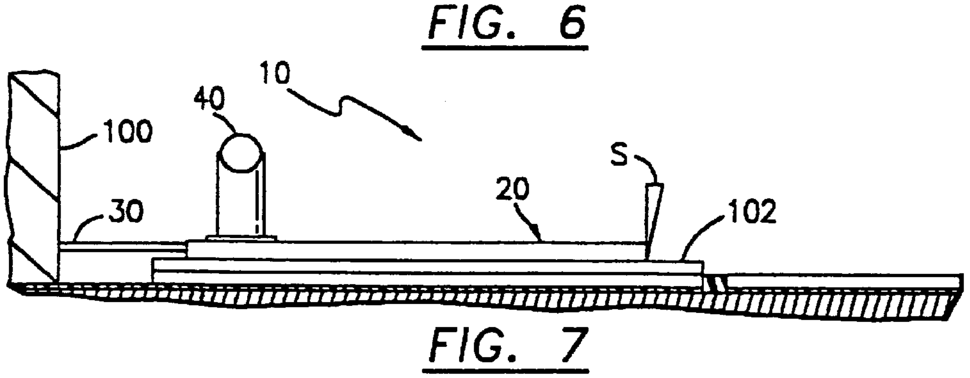
FIG. 7 is a side elevational view of the tile measuring device in use as shown in FIG. 6.

As best seen in FIGS. 6 and 7, the adjustable tile measuring device 10 is used to measure tile so that the tile may be cut to proper size for installation, typically between a previously installed full sized tile and an obstruction, such as a wall, referenced as 100. For example, in a situation where an installer is laying 12" square tile with ½" grout joints with and the last full row of installed tile is spaced 4" from a wall, and the installation requires a desired grout joint of ¼" between the wall and the tile, the installer uses the device as follows: (1) slidably adjusting the device, using reference marks 20C and 30C, to an extended position equal to the tile size (12") plus the grout joint size between tiles (½") plus the wall joint size (¼") such that the device is extended to 12¾"; locking the top and bottom plates using the rotatable handle; temporarily placing a full sized tile, referenced as 102 over the last laid tile near the wall; placing one edge of the device 30A against wall 100 such that the opposite edge of the device 20B is disposed over the temporarily placed tile; scoring the temporarily placed tile using a scoring device "S"; cutting the temporarily place tile along the scored line such that a remaining tile, referenced as 102A, having a length of 3¼" is available for installation in the remaining space between the last laid tile and wall 100 as seen in FIG. 6. Scoring device "S" may be a pencil or other suitable marking or notching instrument.

Figure 8:
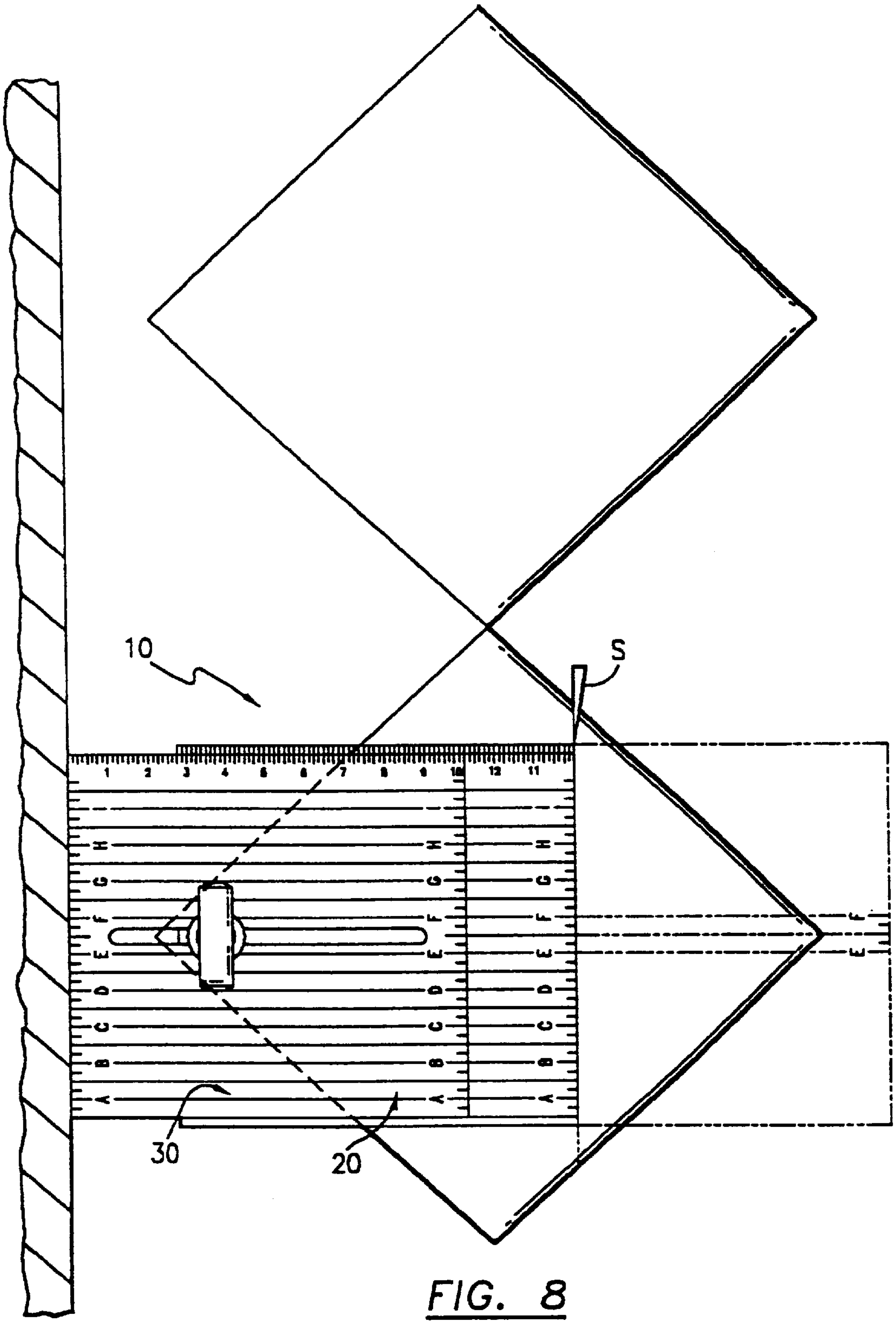
FIG. 8 is a top plan view of the tile measuring device in use in laying tiles in a diagonal pattern.

As depicted in FIG. 8, the device of the present invention is similarly useful in the scoring and cutting of tiles adjacent to walls in installations wherein the tile is laid in a diagonal pattern. In this application, longitudinal markings 26 and 36 provide alignment guides to insure that the tile is properly aligned. In addition, the transparent plates allow the user to verify that the tile is properly aligned. Use of the device to measure and score tiles in a diagonal pattern is substantially similar to the use described hereinabove, except that the diagonal dimension (e.g. corner-to-corner) is used for the full tile dimension.

Figure 9:
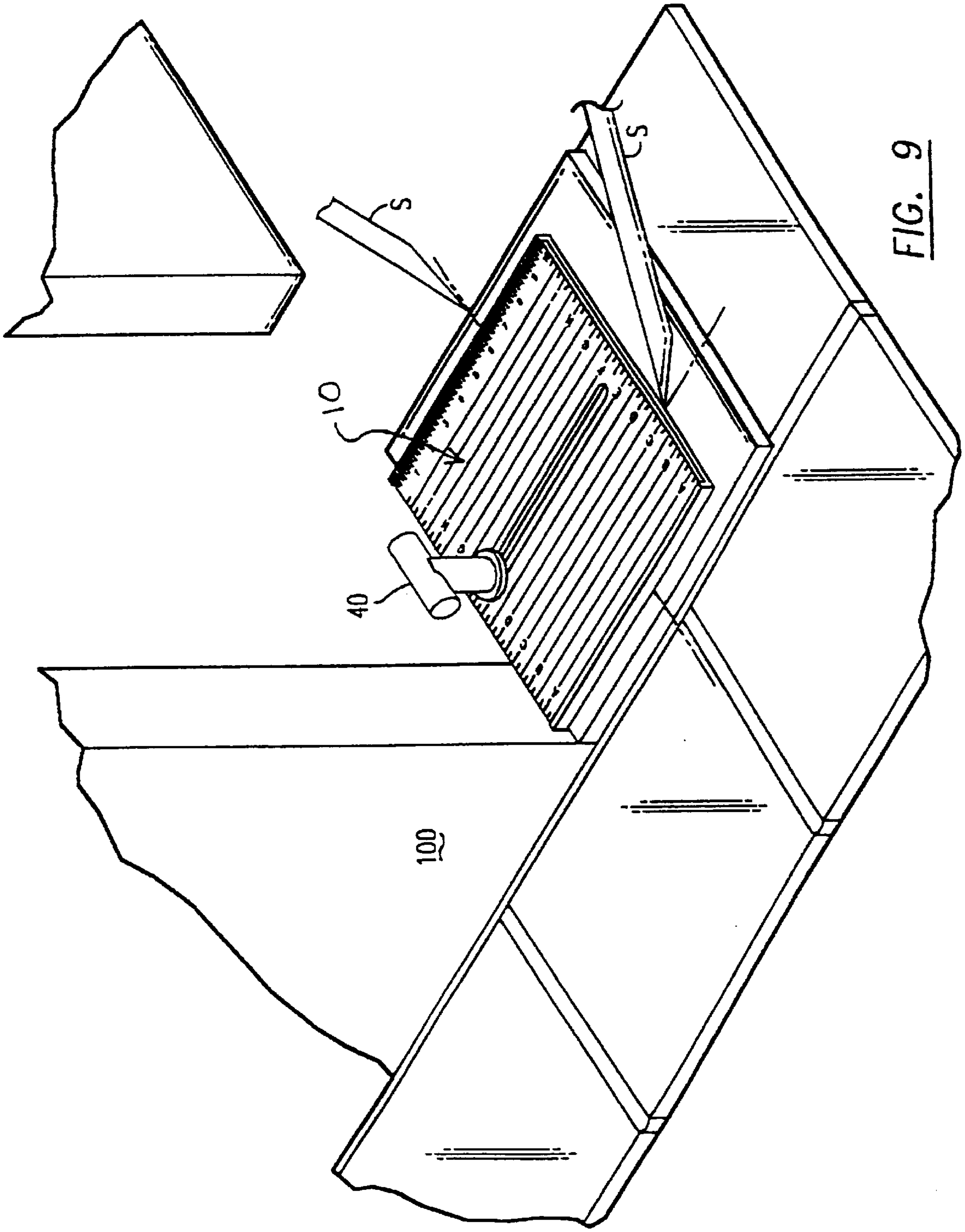
FIG. 9 is a top perspective view of the tile measuring device in use to form notches in tiles for installation around a door jamb.
Figure 10:
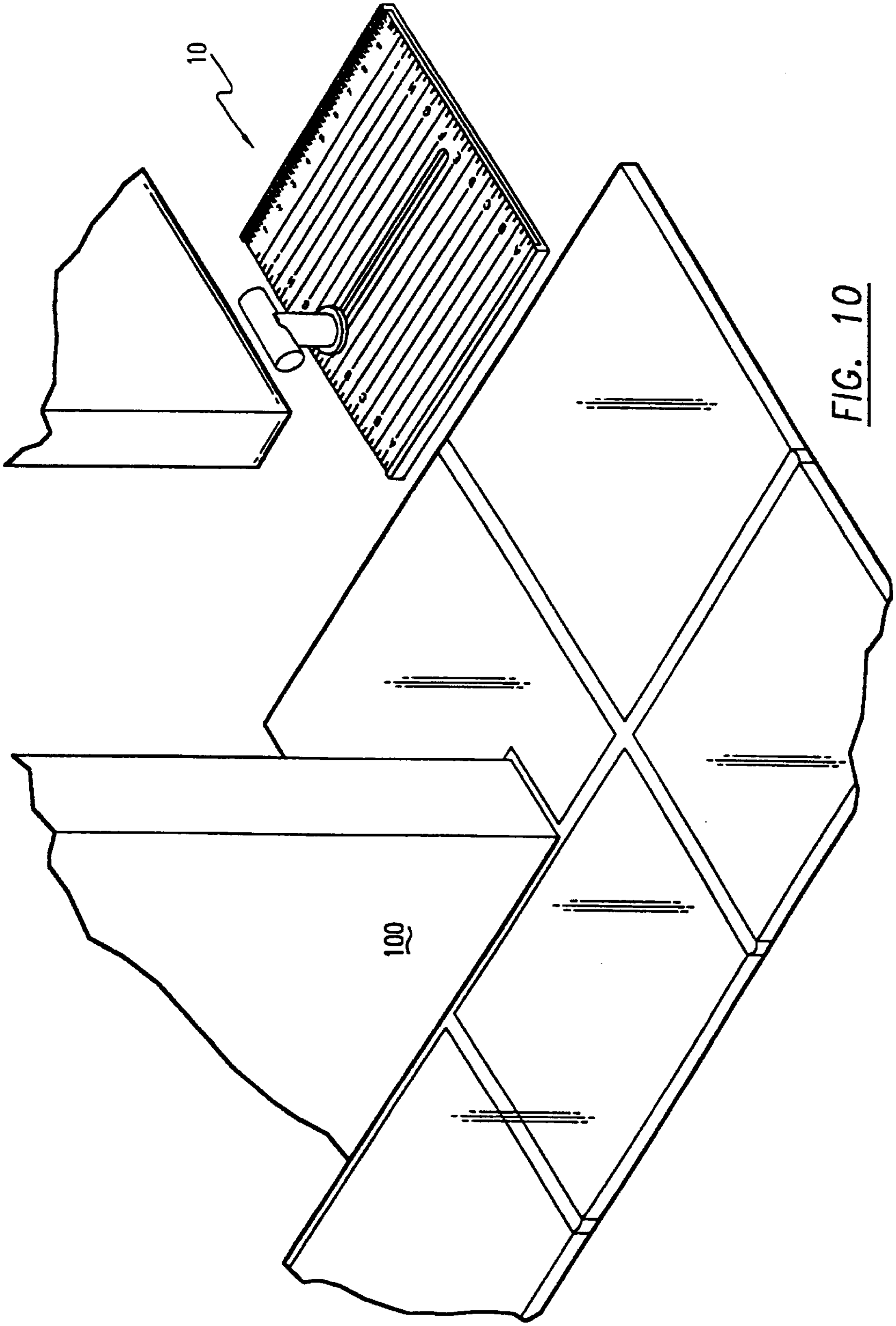
FIG. 10 is a top perspective view of a notched tile installed using the tile measuring device.

As further depicted in FIG. 9, the device 10 is also useful in the formation of notches in tiles such that tiles may be installed around an obstruction, such as a door jamb. Specifically, the device 10 may be used in a two-step process wherein the first step includes the above-referenced method and the second step utilizes longitudinal markings, 26 and 36, allow the device to be used to provide an extended reference for cutting a notch in a tile so that the tile fits around an end portion of a wall 100.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. An adjustable tile measuring device for use in the installation of floor tile, said device comprising:

a substantially planar bottom plate having a front edge, a rear edge and opposing side edges, each side edge forming a vertically extending lip;

a substantially planar top plate having a front edge, a rear edge and opposing side edges;

said top plate and said bottom plate disposed in overlapping relation, said top plate and said bottom plate slidably positioned relative to each other and selectively locked by a rotatable handle and threaded member combination;

said top plate having a first set of markings extending between said front and rear edges of said top plate, said bottom plate having a first set of markings extending between said front and rear edges of said bottom plate;

said first set of markings of said top plate in substantial registry with said first set of markings of said bottom plate wherein said first set of markings of said top plate are of a first positive range and said first set of markings of said bottom plate are of a second positive range, said first positive range having a lower range of numbers as compared to said second positive range.

2. An adjustable tile measuring device according to claim 1, wherein said threaded member extending normal to a top surface of said bottom plate, said threaded member received within a slotted aperture defined by said top plate, and the handle rotatably mounted on said threaded member, said handle adjustable from a first position wherein said top and bottom plates slidably adjust relative to one another, to a second position wherein said top and bottom plates are locked relative to one another.

3. An adjustable tile measuring device according to claim 1 wherein said first set of markings of said top plate and said first set of markings of said bottom plate cooperate with each other to provide a continuous linear dimensional scale when said top and bottom plates are extended with respect to each other.

4. An adjustable tile measuring device according to claim 1 wherein said top and bottom plates are constructed from a transparent material to allow a user to visually inspect any tile disposed underneath said top and bottom plates.

5. An adjustable tile measuring device according to claim 1 wherein said bottom plate further includes a second set of markings and wherein said top plate further includes a second set of markings.

6. An adjustable tile measuring device according to claim 5 wherein said first set of markings and said second set of markings of said bottom plate are disposed in perpendicular relationship to each other on said bottom plate, and wherein said first set of markings and said second set of markings of said top plate are disposed in perpendicular relationship to each other on said top plate.

7. An adjustable tile measuring device for use in the installation of floor tile, said device comprising:

a substantially planar transparent bottom plate defining a top planar surface, a front edge, a rear edge and opposing side edges, each side edge forming a vertically extending lip, a threaded member extending normal to said top planar surface;

a substantially planar transparent top plate having a front edge, a rear edge and opposing side edges, said top plate defining a slotted aperture;

said top plate and said bottom plate disposed in overlapping relation and slidably connected, said bottom plate threaded member received within said top plate slotted aperture;

a rotatable handle mounted on said threaded member, said handle adjustable from a first position wherein said top and bottom plates slidably adjustable relative to one another, to a second position wherein said top and bottom plates are locked relative to one another;

said top plate and said bottom plate each including linear dimensional marking indicia disposed along corresponding said side edges thereof;

said linear dimensional marking indicia of said top plate in substantial registry with said linear dimensional marking indicia of said bottom plate wherein said linear dimensional marking indicia disposed on said top plate are of a first positive range and said linear dimensional marking indicia disposed on said bottom plate are of a second positive range, said first positive range having a lower range of numbers as compared to the said second positive range.

8. An adjustable tile measuring device according to claim 7 wherein said top and bottom plate linear dimensional marking indicia cooperate to provide a continuous linear dimensional scale when said top and bottom plates are extended with respect to each other.

9. An adjustable tile measuring device according to claim 7 wherein said bottom plate further includes a set of longitudinal dimensional markings and wherein said top plate further includes a set of longitudinal dimensional markings.

10. An adjustable tile measuring device according to claim 9 wherein said linear dimensional marking indicia and said set of longitudinal dimensional markings of said bottom plate are disposed in perpendicular relationship to each other, and wherein said linear dimensional marking indicia and said set of longitudinal dimensional markings of said top plate are disposed in perpendicular relationship to each other.

11. A method of measuring and cutting tile for installation between a previously laid full sized tile and a structure using an adjustable tile measuring device having a substantially planar bottom plate and a substantially planar top plate slidably disposed in overlapping relation and means for selectively locking said top plate and said bottom plate relative to one another, each said plate having parallel guide lines extending between a first edge and a second edge thereof, said parallel guide lines of said top plate in substantial registry with corresponding said guide lines of said bottom plate, each said plate further having linear dimensional markings along corresponding side edges thereof, said method including the steps of:

(a) slidably adjusting the top plate with respect to the bottom plate, using the linear dimensional markings as a reference, to an extended position equal to the combined dimensions of a full size tile plus the size of a grout joint between tiles plus the size of a grout joint between a peripheral tile and the structure;

(b) locking the top and bottom plates relative to one another;

(c) temporarily placing a full sized tile over the previously laid full sized tile;

(d) placing one of said first and second edges of one of said top and bottom plates against the structure such that the other of said first and second edges of the other of said top and bottom plates is disposed over the temporarily placed tile;

(e) scoring the temporarily placed tile using a scoring device;

(f) cutting the temporarily placed full sized tile along the scored line such that a cut portion of the temporarily placed full sized tile is suitably sized for installation in the remaining space between the previously laid full sized tile and the structure.

12. The method of claim 11 wherein step (a) comprises the step of turning a rotatable handle.

* * * * *